United States Patent [19]

Meyer et al.

[11] 4,419,197
[45] Dec. 6, 1983

[54] PROCESS FOR CROSS-LINKING OF NON-POLAR POLYMERS IN HIGH FREQUENCY ELECTRIC ALTERNATING FIELDS

[75] Inventors: Heinz Meyer, Hohenschäftlarn; Maximilian Dorn, Munich; Hans Seidl, Grünwald, all of Fed. Rep. of Germany

[73] Assignee: Peroxide-Chemie GmbH, Höllriegelskreuth Bei München, Fed. Rep. of Germany

[21] Appl. No.: 260,481

[22] Filed: May 4, 1981

[30] Foreign Application Priority Data

May 13, 1980 [DE] Fed. Rep. of Germany ....... 3018321

[51] Int. Cl.³ .............................................. C08F 8/00
[52] U.S. Cl. ................................. 204/159.2; 525/386
[58] Field of Search .................... 525/387, 386, 359.2; 204/159.2

[56] References Cited

U.S. PATENT DOCUMENTS 3,534,011 10/1970 Breslow ............................... 525/387
3,563,869 2/1971 Rainer ............................... 204/159.2

FOREIGN PATENT DOCUMENTS 1938503 1/1973 Fed. Rep. of Germany ...... 525/387
7011200 2/1971 Netherlands ......................... 525/387

*Primary Examiner*—Paul R. Michl
*Attorney, Agent, or Firm*—Felfe & Lynch

[57] ABSTRACT

The present invention provides a process for cross-linking non-polar polymers in a high-frequency electric alternating field with the use of a peroxide as cross-linking agent, wherein the cross-linking agent used is a peroxide of the general formula:

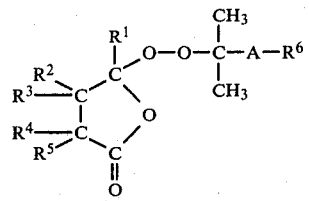

in which
$R^1$ is a hydrogen atom, an alkyl radical containing up to 4 carbon atoms or a phenyl radical optionally substituted by halogen atoms or alkyl radicals containing up to 4 carbon atoms;
$R^2$, $R^3$, $R^4$ and $R^5$, which can be the same or different, are hydrogen atoms or, together with the carbon atoms to which they are attached, represent o-phenylene radicals;
A is a straight-chained or branched alkylene radical containing up to 5 carbon atoms or a straight-chained or branched alkylene radical containing up to 5 carbon atoms or a phenylene radical and;
$R^6$ is a hydrogen atom or a radical of the general formula

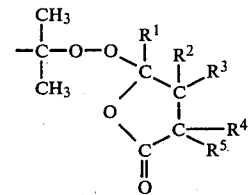

in which $R^1$, $R^2$, $R^3$, $R^4$ and $R^5$ are identified as above.

8 Claims, No Drawings

PROCESS FOR CROSS-LINKING OF NON-POLAR POLYMERS IN HIGH FREQUENCY ELECTRIC ALTERNATING FIELDS

This invention relates to a process for cross-linking non-polar polymers in a high frequency alternating field. More specifically, the invention relates to such a process using peroxides as cross-linking agents.

It is already known to cross-link unsaturated macromolecules, such as natural rubber, with sulphur or sulphur-yielding reagents, such as thiuram disulphides. The cross-linking of polymers by the action of electron or γ-rays is also already known (so-called radiation cross-linking).

The cross-linking of polymers without double bonds takes place either with radiations (electrons or γ-rays), by grafted vinylsilanes (Dow-Corning process) or also, in particular, by peroxides which break down into radicals at an elevated temperature. These radicals can, by splitting off hydrogen atoms from polymers, provide polymer radicals which can recombine with cross-linking. The supply of heat initiating the breakdown of the peroxides can take place by direct heating, by infra-red radiation, by hot gaseous or liquid media or also by ultrasonic waves.

When the polymer is a polar material, the heat can also be supplied by a high-frequency electric alternating field (microwaves, VHF). Non-polar synthetic resins can only be heated in a high-frequency electric alternating field when they contain polar adjuvant or filling materials, for example carbon black or triallyl cyanurate. However, these additives are also VHF-active after the cross-linking process, which is undesirable, for example, when using cross-linked polyethylenes for high voltage insulation.

Therefore, in Federal Republic of Germany Patent Specification Nos. 26 11 349 and 28 03 252, it is suggested, in the case of processes for cross-linking synthetic resins, also to add peroxides which are polar and to bring about a heating up and a cross-linking of the synthetic resins by the action of high-frequency electric alternating fields. The dialkyl peroxides and diaralkyl peroxides, as well as the perketals and hydroperoxides normally used for cross-linking polymers are not excited by a high-frequency electric alternating field (see Kunststoffe, 69(8), 430 et seq./1979). The peroxides which are effective for cross-linking and which can be excited by high-frequency electric alternating field, for example the peresters, possess, for most uses, too low a scorch safety, i.e. they tend to bring about a premature, undesired cross-linking, especially during the incorporation of the peroxides into the polymers by the action of heat.

Federal Republic of Germany Patent Specification No. 28 03 252 discloses the use of tert.-butyl perbenzoate and of analogous organic peroxides as adjuvants for cross-linking synthetic resins and/or rubbers to be used as electrical insulators, by the action of a high-frequency electric alternating field. However, this perester and its analogues, which are well-known as cross-linking agents, suffer from the decisive disadvantage that when they are mixed with the synthetic resins and/or rubbers to be cross-linked, the above-mentioned scorch problems can occur, i.e. an undesired, premature cross-linking, when these synthetic resin materials are, for example, polyethylene or ethylene/propylene rubbers or ethylene/propylene/diene rubbers. Furthermore, the peresters are very sensitive to carbon black, i.e. in the presence of carbon black, which is a very favored filling material, they tend to decompose prematurely and thus to lose active oxygen. Consequently, when using tert.-butyl perbenzoate in polyethylene, it is necessary to maintain a maximum working up temperature of 110° to 120° C. ($t_2$=5.5 min.). In the case of ethylene/propylene rubber and of ethylene/propylene/diene rubber, the maximum working up temperature for tert.-butyl perbenzoate is 90° C. ($t_2$=70 min.). This state of affairs makes the use of this peroxide very difficult since, normally, the mixing of the polymers to be cross-linked with the peroxide takes place at substantially higher temperatures in the conventional mixing apparatus, for example roller frames, stamp kneaders, extruders and the like.

Furthermore, the tert-butyl perbenzoate used according to Federal Republic of Germany Patent Specification No. 28 03 252 already possesses, at the above-given maximum working temperature, so high a volatility that it vaporizes from open mixing apparatus and gives rise to environmental contamination.

It is an object of the present invention to find peroxides for cross-linking non-polar polymers in high-frequency electric alternating fields which, upon mixing with the polymers, do not give rise to scorch problems, i.e. do not lead to a premature cross-linking, even when mixing temperatures of from 130° to 140° C. are used, which are less volatile than the conventionally used peroxides, which can be excited in a high-frequency electric alternating field as well as or better than the previously used peroxides, which display a good or even an improved cross-linking effectiveness and which are not sensitive to carbon black.

Surprisingly, we have now found that this problem can be solved by the use of peroxides of the general formula:

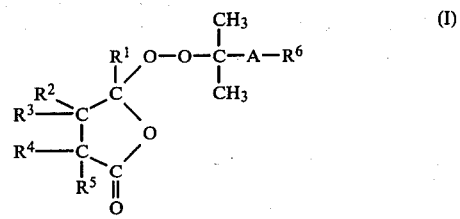

in which $R^1$ is a hydrogen atom, an alkyl radical containing up to 4 carbon atoms or a phenyl radical optionally substituted by halogen atoms or alkyl radicals containing up to 4 carbon atoms, $R^2$, $R^3$, $R^4$ and $R^5$, which can be the same or different, are hydrogen atoms or, together with the carbon atoms to which they are attached, represent an o-phenylene radical, A is a straight-chained or branched alkylene radical containing up to 5 carbon atoms, a straight-chained or branched alkenylene radical containing up to 5 carbon atoms or a phenylene radical and $R^6$ is a hydrogen atom or a radical of the general formula:

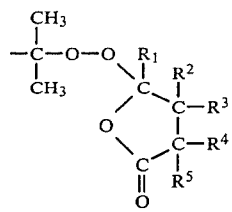

(II)

in which $R^1$–$R^5$ have the same meanings as above.

These peroxides have high melting temperatures or boiling points, high scorch temperatures, a high VHF activity, a high cross-linking effectiveness and a low carbon black sensitivity.

Thus, according to the present invention, there is provided a process for cross-linking non-polar polymers in a high-frequency electric alternating field, with the use of a peroxide as cross-linking agent, wherein the cross-linking agent used is a peroxide of the above-given general formula (I).

According to a preferred embodiment of the present invention, the peroxide used is a tert.-alkylperoxy-3-phenylphthalide of the general formula:

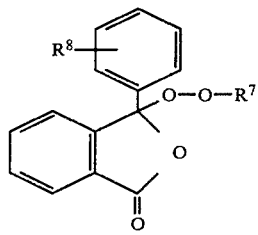

(III)

in which $R^7$ is a tert.-alkyl radical containing 4 to 8 carbon atoms and $R^8$ is a hydrogen or chlorine atom or an alkyl radical containing up to 4 carbon atoms.

According to another preferred embodiment of the present invention, a peroxide is used of general formula (III) in which $R^7$ is a tert.-butyl, tert.-amyl or tert.-octyl radical and $R^8$ is a hydrogen or chlorine atom or a methyl radical.

Examples of non-polar polymers which can be cross-linked by the process according to the present invention include low density and high density polyethylene, ethylene/propylene rubber, ethylene/propylene/diene rubber, natural rubber, polyisoprene rubber, polybutadiene rubber, silicone rubber and polybutylene.

However, the process according to the present invention can also be applied to polar polymers, even though polar polymers can also be cross-linked with conventional cross-linking-active peroxides in a high frequency electric alternating field.

The process according to the present invention preferably makes use of the peroxide in an amount which corresponds to a content of active oxygen in the polymer to be cross-linked of from 0.02 to 0.4% by weight and preferably of from 0.08 to 0.25% by weight. In general, these amounts of active oxygen correspond to a peroxide content of from 0.5 to 10% by weight and preferably of from 2 to 6% by weight.

Polymers which are preferably to be cross-linked according to the present invention include polyethylene, ethylene copolymers and ethylene terpolymers, such as the above-mentioned ethylene/propylene copolymers and ethylene/propylene/diene terpolymers, as well as, quite generally, homo- and copolymers of α-olefins.

The peroxides of general formula (I) and (III) to be used in the process according to the present invention are known from Federal Republic of Germany Patent Specification Nos. 15 43 353 and 15 18 128 and can be prepared by the processes described in these Patent Specifications or by processes which are analogous thereto.

In Federal Republic of Germany Patent Specification No. 15 18 128, it is stated that the peroxy phthalides described therein and which correspond to the above-given general formula (III) can be used as radical formers for hardening unsaturated polyesters and lacquers containing polymerisable or cross-linkable compounds and especially for grafting reactions. However, these Patent Specifications contain no indication whatsoever that the peroxides used according to the present invention are suitable, in an especially advantageous manner, for cross-linking non-polar polymers in high-frequency electric alternating fields in that they:

(a) have a higher scorch temperature than the usual peresters hitherto used for this purpose, for example tert.-butyl perbenzoate, so that, without premature cross-linking, they make possible the extrusion of peroxide-containing polyethylene which, depending upon its density, has a softening temperature of from 105° to 140° C.;

(b) respond more strongly to the high-frequency electric alternating field than the previously known peresters;

(c) display a better cross-linking effectiveness in the case of the irradiation than the previously known peresters;

(d) are much less volatile than the previously used peresters, and (e) display no sensitivity to carbon black, as do the previously used peresters.

The process according to the present invention can be carried out in devices conventionally employed for producing a high-frequency electric alternating field, which usually operate at 2450 MHz. The VHF capacity of these devices thereby strongly influences the heating up time. The industrial plants possess capacities of about 2.5 to 30 kW.

The process according to the present invention is particularly suitable for cross-linking cable insulations, pipes, profiles, shaped bodies, foamed materials, seals, joints and the like made from polyethylene, ethylene/propylene rubber, ethylene/propylene/diene rubber, silicone rubber, natural rubber, isoprene rubber, butyl rubber, butadiene rubber and olefin copolymers.

The process according to the present invention enables the use of conventional, expensive heating plant to be avoided and results in a substantial increase in the rate of production of the cross-linked products being achieved.

The following Examples are given for the purpose of illustrating the present invention:

EXAMPLE 1

4.8 g. 3-tert.-Butylperoxy-3-phenylphthalide (FFT) are mixed with 100 g. polyethylene (Lupolene 1800 S; BASF) by extrusion or the materials are dry mixed and then melted for 30 minutes at 125° C. The material heated to 125° C. is placed for 5 minutes in a microwave oven (Siemens) which is operated at a nominal capacity of 500 W and at a wavelength of 2450 MHz, the material thereby being heated to 190° C.

The cross-linked material so obtained has a swelling value of 4.7 after treatment with xylene at 140° C. for a period of time of 2 hours.

The above-described procedure is repeated with the use of mole equivalent amounts of tert.-butyl perbenzoate (TBPB, 3 g.), 3-tert.-butylperoxy-3-(p-chlorophenyl)-phthalide (CLFFT, 5 g.), γ-tert.-butylperoxyvalerolactone (TBVLA, 3 g.) and di-(tert.-butylperoxy)terephthalate (TBPT, 4.5 g.). The results obtained are summarised in the following Table I:

TABLE I

| No. | peroxide used | content of active oxygen (%) in the peroxide | scorch temperature (°C.) | amount of peroxide (wt. %) | m.p. of the peroxide (°C.) | oxygen content (parts per 100 parts of polymer | initial temp. (°C.) | final temp. after 5 minutes (°C.) | swelling value | gel content (%) |
|---|---|---|---|---|---|---|---|---|---|---|
| 1 | TBPB | 8 | 125 | 3.0 | — | 0.24 | 125 | 160 | 6.0 | 40 |
| 2 | CLFFT | 4.8 | 145 | 5.0 | 42–45 | 0.24 | 125 | 220 | 4.6 | 66 |
| 3 | FFT | 5.0 | 140 | 4.8 | 108–114 | 0.24 | 125 | 200 | 4.7 | 65 |
| 4 | TBVLA | 8.1 | 150 | 3.0 | 38–44 | 0.24 | 125 | 160 | 10.3 | 71 |
| 5 | TBPT* (50% with polyethylene) | 5.3 | 130 | 4.5 | — | 0.24 | 125 | 160 | 5.7 | 48 |

*TBPT (i.e. di-(tert.-butylperoxy)-terephthalate) must be desensitised with polyethylene because, in pure form, it is explosive. In contradistinction thereto, the peroxides used according to the present invention can be employed in technically pure form.

EXAMPLE 2

100 Parts by weight of ethylene/propylene/diene rubber (Keltan 778) are mixed on a roller frame with 50 parts by weight of micronised oil chalk, 50 parts by weight of white oil (Ondina g 17; Shell), 1 part by weight of polymeric 1,2,4-trimethyldihydroquinoline (Flectol H; Monsanto) and 10 parts by weight of carbon black (Corax P; Degussa). Finally, peroxides are admixed at a temperature of about 90°–100° C.

From the final, cooled rolled sheet there are cut out shaped parts with a thickness of about 2 cm. which are heated up from ambient temperature in the microwave oven used in Example 1. The irradiation time in the microwave oven, operated with a capacity of 500 W, is uniformly 12 minutes. The peroxide content employed corresponds uniformly to a content of active oxygen of 0.24%, referred to the polymer.

The results hereby obtained with various peroxides are summarized in the following Table II:

TABLE II

| No. | peroxide | content of active oxygen (%) in the peroxide | scorch temperature (°C.) | amount of peroxide (wt. %) | initial temp. (°C.) | final temp. (°C.) | swelling value |
|---|---|---|---|---|---|---|---|
| 6 | without | — | — | — | 25 | 240 | dissolves |
| 7 | TBPB | 3.0 | 125 | 3.0 | 25 | 100 | dissolves |
| 8 | FFT | 5.0 | 140 | 4.8 | 25 | 190 | 4 |
| 9 | CLFFT | 4.8 | 140 | 5.0 | 25 | 190 | 4 |
| 10 | TBVLA | 8.1 | 150 | 3.0 | 25 | 190 | 10.3 |
| 11 | TBPT | 5.3 | 130 | 4.5 | 25 | 130 | dissolves |

The perester tert.-butyl perbenzoate is decomposed by carbon black and simultaneously deactivates the carbon black so that no equally strong heating up takes place in the microwave oven as without the addition of peroxide. The values for the peroxides FFT, CLFFT and TBVLA used according to the present invention are substantially above the values of the comparison peroxides (experiments Nos. 6, 7 and 11).

EXAMPLE 3

The effectiveness of the peroxides used according to the present invention (FFT, CLFFT, TBPVL) for cross-linking polyethylene was compared, in a measurement kneading device as described in Federal Republic of Germany Patent Specification No. 11 89 710, with the effectiveness of tert.-butyl perbenzoate and di-(tert.-butylperoxy)-terephthalate, a high pressure highly branched polyethylene with a density of 0.918 g./cm³ thereby being used.

55 g. amounts of polymer were cross-linked with the peroxides stated in the following Table III at the there-given temperatures, with the use of equivalent amounts of active oxygen of 0.15%. In the measurement kneader there was determined the kneading resistance with which a heated material countered the rotation of two cams, the kneading resistance being expressed in plastograph units, a higher resistance thereby meaning a better degree of cross-linking.

The results obtained are summarised in the following Table III:

TABLE III

| peroxide | $T_s$ (°C.) | $T_R$ (°C.) | $W_u$ | $W_{max}$ | $\Delta W$ | $\Delta t$ (min) | F Wm/Wu | L F/Δt |
|---|---|---|---|---|---|---|---|---|
| t.-butyl perbenzoate | 125 | 150 | 60 | 280 | 220 | 4.5 | 4.6 | 1.0 |
|  |  | 170 | 60 | 480 | 420 | 2 | 8 | 4.0 |
| di-(t.-butylperoxy)-terephthalate | 130 | 150 | 100 | 560 | 460 | 5.5 | 5.6 | 1.0 |
|  |  | 170 | 80 | 500 | 420 | 2 | 6.2 | 3.0 |
| 3-phenyl-3-tert.-butyl- | 140 | 150 | 80 | 640 | 560 | 8.5 | 8 | 0.9 |

TABLE III-continued

| peroxide | $T_s$ (°C.) | $T_R$ (°C.) | $W_u$ | $W_{max}$ | ΔW | Δt (min) | F $W_m/W_u$ | L F/Δt |
|---|---|---|---|---|---|---|---|---|
| peroxy-phthalide (FFT) | | 170 | 80 | 640 | 560 | 2 | 8 | 4 |
| 3-p-chlorophenyl-3-tert.-butylperoxy-phthalide (ClFFT) | 145 | 170 | 60 | 540 | 480 | 4 | 9.0 | 2.25 |
| | | 170 | 60 | 540 | 480 | 1 | 9.0 | 9.0 |
| γ-t.-butylperoxy-valero-lactone (TBPVL) | 150 | 170 | 70 | 550 | 480 | 4 | 7.85 | 1.96 |
| | | 190 | 60 | 600 | 540 | 2 | 10 | 5 |

The abbreviations used in the above Table III have the following meanings:

$T_s$ pre-cross-linking temperature (that temperature at which, in the course of 10 minutes after the addition of the peroxide, a noticeable increase of the kneading resistance occurs without a really good cross-linking taking place; as a standard, there was used an increase of the kneading resistance by about 100 measurement kneader units $T_R$ reaction temperature $W_u$ kneading resistance of the non-cross-linked material $W_{max}$ maximum kneading resistance achieved after cross-linking ΔW $W_{max} - W_u$ Δt temperature up to the achievement of $W_{max}$ after the addition of the peroxide F $W_{max}/W_u$ L F/Δt.

From the above described experiments and comparative experiments, it can readily be seen that the peroxides used in the process according to the present invention are much superior to the conventional peroxides with regard to the cross-linking of non-polar polymers in high-frequency electric alternating fields.

It will be understood that the specification and examples are illustrative but not limitative of the present invention and that other embodiments within the spirit and scope of the invention will suggest themselves to those skilled in the art.

What is claimed is:

1. Process for cross-linking non-polar polymers in a high frequency electric alternating field which comprises contacting the non-polar polymer with a peroxide cross-linking agent and exposing the mixture to a microwave electric alternating field, wherein the cross-linking agent peroxide is of the formula

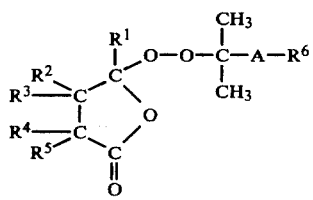

in which $R^1$ is a hydrogen atom, an alkyl radical containing up to 4 carbon atoms or a phenyl radical optionally substituted by halogen atoms or alkyl radicals containing up to 4 carbon atoms;

$R^2$, $R^3$, $R^4$ and $R^5$, which can be the same or different, are hydrogen atoms or, together with the carbon atoms to which they are attached, represent o-phenylene radicals;

A is a straight-chained or branched alkylene radical containing up to 5 carbon atoms or a straight-chained or branched alkylene radical containing up to 5 carbon atoms or a phenylene radical and;

$R^6$ is a hydrogen atom or a radical of the general formula

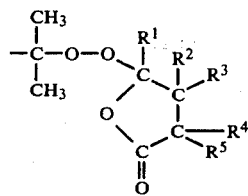

in which $R^1$, $R^2$, $R^3$, $R^4$ and $R^5$ are identified as above.

2. Process as claimed in claim 1, wherein the peroxide is a tert.-alkylperoxy-3-phenylphtalide of the formula

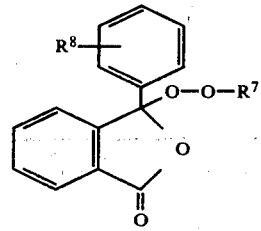

in which $R^7$ is a tert.-alkyl radical containing 4 to 8 carbon atoms and;

$R^8$ is a hydrogen or chlorine atom or an alkyl radical containing up to 4 carbon atoms.

3. Process as claimed in claim 2, wherein in the formula $R^7$ is a tert.-butyl, tert.-amyl or tert.-octyl radical; and $R^8$ is a hydrogen or chlorine atom or a methyl radical.

4. Process as claimed in claim 1, wherein the peroxide is used in an amount which corresponds to a content of active oxygen in the polymer to be cross-linked of from 0.02 to 0.4% by weight.

5. Process as claimed in claim 4, wherein the peroxide is used in an amount which corresponds to a content of active oxygen in the polymer to be cross-linked of from 0.08 to 0.25% by weight.

6. Process as claimed in claim 1, wherein the polymer used is an ethylene polymer selected from polyethylene, ethylene copolymers and ethylene terpolymers.

7. Process as claimed in claim 6, wherein the ethylene copolymer used is an ethylene/propylene copolymer.

8. Process as claimed in claim 6, wherein the ethylene terpolymer is an ethylene/propylene/diene terpolymer.

* * * * *